2,982,781
PROCESS FOR PRODUCING β-AMINONITRILES AND β-AMINOESTERS

Phillip D. Montgomery, Texas City, and Roy A. Hughes, Galveston, Tex., assignors to Monsanto Chemical Company, St. Louis, Mo., a corporation of Delaware No Drawing. Filed Aug. 23, 1957, Ser. No. 680,005

7 Claims. (Cl. 260—465.5)

The present invention relates to an improved method for the production of certain types of amino compounds. More particularly, it relates to the preparation of β-aminonitriles and β-aminoesters.

It is well known that valuable amino compounds can be obtained by the addition reaction effected between α,β-unsaturated nitriles and a nitrogen-reactive ammonia base such as ammonia, hydroxylamines, hydrazines, aliphatic, hydroaromatic or aromatic primary or secondary amines and polyamines of the same kind. Likewise, primary amines react readily with esters of α,β-unsaturated carboxylic acids such as methyl acrylate, for example, to yield β-aminopropionates. Generally, amines react with α,β-unsaturated acid derivatives of the acrylate type such as the lower aliphatic esters and nitriles of acrylic acid, methacrylic acid and crotonic acid without the aid of a catalyst. However, in this addition reaction steric effects are very important and the size and branching of the alkyl groups have a definite influence on the reaction. Yields, for example, reported for the reaction of acrylonitrile with tert-butylamine have been considerably lower than for the other butylamines. This decrease in yield is even more pronounced with tert-octylamine where the use of elevated temperatures, extended reaction time, or basic catalysts have all failed to give yields above 30%. The use of an acidic catalyst to overcome this difficulty has been described but certain losses of the amine reactant must be tolerated if it is to be used. Theoretically, the amine can be recovered by reaction of the acid derivative with a stronger base. Practically, however, this represents an additional step in the process as well as an additional reactant, acid losses occur in the recovery step, and the distillation system for recovery of the product is complicated by the presence of salts.

Recently, it has been discovered that these difficulties in the prior art can be obviated to a great extent by employing water as a catalyst in the addition reaction between amines which are characterized by steric hindrance and the α,β-unsaturated acid derivatives to give β-aminonitriles and β-aminoesters. The use of water as a catalyst provides excellent yields on a comparative basis. However, on an absolute basis with amines having a higher number of carbon atoms such as nonylamine and higher, the yields still leave something to be desired. It has now been discovered that yields from these higher amines can be materially increased by employing an N,N-disubstituted amide as a solubilizer for the water catalyst in the reaction of these amines with α,β-unsaturated acid derivatives.

According to the invention, tert-carbinamines of the formula $$RR'R''CNH_2$$

wherein R, R' and R'' are chosen from the group consisting of alkyl, cycloalkyl, aryl, alkaryl and aralkyl radicals containing from 1 to 12 carbon atoms are reacted with a compound chosen from the group consisting of the lower aliphatic esters and nitriles of α,β-unsaturated acids in the presence of a catalytic amount of water and an N,N-disubstituted amide as a solubilizer therefor to yield the corresponding β-aminonitriles and β-aminoesters.

The following examples are presented to illustrate the invention but are not to be construed as limiting it in any manner.

EXAMPLE I

A series of experiments were made in which tert-nonylamine and tert-pentadecylamine were reacted with acrylonitrile. The nonylamine and pentadecylamine employed were mixtures of isomers of essentially tert-carbinamine structure obtained by the Ritter reaction of propylene trimer and hydrogen cyanide and propylene pentamer and hydrogen cyanide, respectively. In one run, precautions were taken to use substantially anhydrous reagents. In the second run, water was added as a catalyst and in the other runs an N,N-disubstituted amide was added as a solubilizer with the water catalyst. The reactions were carried out in a 500-ml., round-bottom, three-neck flask fitted with a 250-ml. dropping funnel, a thermometer, a stirrer, a reflux condenser, and a heating mantle. Equimolar quantities of the reactants were used. The amine, amine and water, or amine, water and solubilizer, was charged to the flask, stirred, and heated to a temperature of about 80° C. Then the acrylonitrile was added dropwise from the funnel over a period of from about 15 to about 50 minutes. After addition of the acrylonitrile was completed, the reaction mixture was refluxed for a period of one hour. Thereafter, it was cooled, transferred to a flask fitted with a 6-in. x 1-in. distillation column packed with glass beads and distilled. The water and excess acrylonitrile were removed at atmospheric pressure while the product β-(tert-nonylamino)propionitrile or β-(tert-pentadecylamino)propionitrile, was separated from excess amine under vacuum (∼0–15 mm. of Hg absolute). The yield of product was calculated in each case. Specific reaction conditions together with the data obtained in the runs are presented in Table I.

Table I

| Amine | Mole Amine/Mole AN[1] Fed | Percent H₂O Added | Solubilizer | Amt of Solubilizer, Wt. Percent of Amine | Reaction Temp., °C. | Aminonitrile Product (g.) | Conversion, Percent |
|---|---|---|---|---|---|---|---|
| t-nonyl | 0.5/0.5 | None | None | 0 | 84–89 | 0 | 0 |
| Do | 0.5/0.5 | 10 | do | 0 | 84–89 | 26.3 | 26.8 |
| Do | 0.25/0.25 | 10 | N,N-dimethylformamide | 10 | 78–85 | 20.1 | 41.0 |
| Do | 0.25/0.25 | 10 | do | 20 | 78–81 | 32.6 | 66.5 |
| t-pentadecyl | 0.25/0.25 | None | None | 0 | 79–85 | 0 | 0 |
| Do | 0.25/0.25 | 10 | do | 0 | 78–82 | 16.4 | 23.4 |
| Do | 0.25/0.25 | 10 | N,N-dimethylacetamide | 100 | 79–86 | 26.4 | 37.7 |

[1] Acrylonitrile.

From these data it can be seen that the addition of N,N-disubstituted amides effects solubilization of water in the higher tert-carbinamines which are characterized by steric hindrance in a system containing these amines, acrylonitrile, and water. By so doing they facilitate the functioning of the water as a catalyst and result in significant increases in yields in the addition reaction of these "hindered" amines and α,β-unsaturated acid derivatives.

Some variations may be made in reaction conditions from those given in the example without departing from the scope of the invention. Other suitable amines in addition to those mentioned in the examples which may be reacted according to the process of the invention include, for example, 3-methyl-3-aminohexane, 3-ethyl-3-aminopentane, tert-pentadecylamine, 2-cyclohexyl-2-amino-butane, 2-cyclopentyl-2-aminopropane, 2-phenyl-2-aminopropane, 2-benzyl-2-aminohexane, 2-tolyl-2-aminobutane, 1,1-di-(p-methylphenyl)-1-aminoethane, 1-cyclohexyl-1-benzyl-1-amino-propane, and the like. Likewise, in addition to those given in the examples, suitable nitriles and lower aliphatic esters of α,β-unsaturated acids include methacrylonitrile, crotononitrile, methyl acrylate, methyl methacrylate, propyl acrylate, ethyl methacrylate, propyl crotonate, methyl crotonate, and the like. "Lower aliphatic esters" is taken to mean those esters in which the alcohol portions of the ester is an alkyl group containing from 1 to 4 carbon atoms.

While it is preferred to employ stoichiometric quantities of the reactants, quantities in slight excess of the theoretical may be employed. No advantage is seen in using large excesses of either reactant while some difficulties might be created in certain instances.

The amount of water employed as catalyst may vary over a wide range from as little as 0.1% to as much as 15% by weight of the amine. Preferably, from about 3% to about 10% water provides most effective catalysis of the reaction.

The amount of N,N-disubstituted amide solubilizer to be employed may be varied widely depending upon the amine being reacted and the amount of water employed as catalyst in a specific instance. The optimum quantity is represented by the minimum amount which will effect a completely homogeneous solution of the reactants and the water catalyst. This is readily determinable by observation or by simple testing. Generally, from about 10% to about 100% of the solubilizer by weight of the amine reactant is employed.

Any of the N,N-disubstituted amides which are water-soluble are suitable for use as solubilizers. Particularly prefered are the N,N-dialkylsubstituted amides. In addition to those mentioned in the examples, other disubstituted amides which may be employed include diethylformamide, diethylacetamide, dimethylpropionamide, diethylproprionamide, dipropylacetamide, and the like.

Generally, the reaction proceeds at temperatures from about room temperature to about 150° C. In some cases, it can be conducted at temperatures as low as 0° C. and as high as 200° C. but in any case reaction temperature is maintained below the decomposition temperatures of the reaction components. At room temperature or below, an extended period of time may be required for reaction, so it is preferred to conduct the reaction at temperatures between about 40 and 100° C.

The aminonitriles produced by the invention are useful as chemical intermediates. They may be readily reduced to polyamines and the amino group therein is available for reaction with acids, alkylene oxides, alkyl acid chlorides, and the like for the preparation of many useful products such as textile assistants, solvents, etc. The aminoesters lead to detergents, emulsifying agents, surfactants, flotation agents, and the like.

What is claimed is:

1. The process for producing β-aminonitriles and β-aminoesters which comprises reacting a tert-carbinamine of the formula $$RR'R''CNH_2$$

wherein R, R' and R'' are chosen from the group consisting of alkyl, cycloalkyl, aryl, alkaryl, and aralkyl radicals containing from 1 to 12 carbon atoms with a compound selected from the group consisting of the nitriles and lower alkyl esters of acrylic acid, methacrylic acid, and crotonic acid at a temperature in the range from about 0° C. to about 200° C. in the presence of a catalytic quantity of water, said amount of water being in the range from about 0.1% to about 15% by weight of the tert-carbinamine and a water-soluble N,N-dialkylamide of a lower unsubstituted monocarboxylic acid in which the alkyl substituents are lower alkyl groups as a solubilizer therefor, said solubilizer being present in an amount in the range from about 10% to about 200% by weight of the carbinamine.

2. The process for producing β-aminonitriles and β-aminoesters which comprises reacting a tert-carbinamine of the formula $$RR'R''CNH_2$$

wherein R, R' and R'' are alkyl radicals containing from 1 to 12 carbon atoms with a compound selected from the group consisting of the nitriles and lower alkyl esters of acrylic acid, methacrylic acid, and crotonic acid at a temperature in the range from about 0° C. to about 200° C. in the presence of a catalytic quantity of water, said amount of water being in the range from about 0.1% to about 15% by weight of the tert-carbinamine, and a water-soluble N,N-dialkylamide of a lower unsubstituted monocarboxylic acid in which the alkyl substituents are lower alkyl groups as a solubilizer therefor, said solubilizer being present in an amount in the range from about 10% to about 200% by weight of the carbinamine.

3. A process for the production of aminonitriles which comprises reacting a tert-carbinamine of the formula $$RR'R''CNH_2$$

wherein R, R' and R'' are alkyl radicals containing from 1 to 12 carbon atoms with acrylonitrile at a temperature in the range from about 0° C. to about 150° C. in the presence of an amount of water in the range from about 0.1% to about 15% by weight of the tert-carbinamine and a water-soluble N,N-dialkylamide of a lower unsubstituted monocarboxylic acid in which the alkyl substituents are lower alkyl groups as a solubilizer therefor, said solubilizer being present in an amount in the range from about 10% to about 200% by weight of the carbinamine.

4. A process for the production of β-(tert-nonylamino)-propionitrile which comprises reacting tert-nonylamine with acrylonitrile at a temperature within the range from about 40° C. to about 100° C. in the presence of an amount of water within the range from about 3% to about 10% by weight of the nonylamine and as a solubilizer therefor an amount of dimethylformamide in the range from about 10% to about 200% by weight of said nonylamine.

5. A process for the production of β-(tert-nonylamino)-propionitrile which comprises reacting tert-nonylamine with acrylonitrile at a temperature within the range from about 40° C. to about 100° C. in the presence of an amount of water within the range from about 3% to about 10% by weight of the nonylamine and as a solubilizer therefor an amount of dimethylacetamide in the range from about 10% to about 200% by weight of said nonylamine.

6. A process for the production of β-(tert-pentadecylamino)propionitrile which comprises reacting tert-pentadecylamine with acrylonitrile at a temperature within the range from about 40° to about 100° C. in the presence of an amount of water within the range from about 3% to about 10% by weight of the pentadecylamine and as a solubilizer therefor an amount of dimethylformamide in the range from about 10% to about 200% by weight of said pentadecylamine.

7. A process for the production of β-(tert-pentadecylamino)-propionitrile which comprises reacting tert-pentadecylamine with acrylonitrile at a temperature within the range from about 40° to about 100° C. in the presence of an amount of water within the range from about 3% to about 10% by weight of the pentadecylamine and as a solubilizer therefor an amount of dimethylacetamide in the range from about 10% to about 200% by weight of said pentadecylamine.

References Cited in the file of this patent

UNITED STATES PATENTS

| 1,992,615 | Hoffmann et al. | Feb. 26, 1935 |
| 2,451,852 | McLamore | Oct. 19, 1948 |